United States Patent [19]

Kaehler

[11] 4,440,150
[45] Apr. 3, 1984

[54] HELIOSTAT CONTROL

[75] Inventor: James A. Kaehler, Littleton, Colo.

[73] Assignee: Atlantic Richfield Company, Inc., Dallas, Tex.

[21] Appl. No.: 342,155

[22] Filed: Jan. 25, 1982

[51] Int. Cl.³ .................................................. F24J 3/02
[52] U.S. Cl. ...................... 126/425; 136/248; 250/203 R; 350/289; 353/3; 364/516
[58] Field of Search ............... 126/424, 425, 438; 250/203 R, 491; 353/3; 350/288, 289, 292, 299; 364/420, 516, 518

[56] References Cited

U.S. PATENT DOCUMENTS

| 4,031,444 | 6/1977 | Beck ................................. 126/425 X |
| 4,086,485 | 4/1978 | Kaplow et al. ................. 250/203 R |
| 4,215,410 | 7/1980 | Weslow .............................. 364/516 |
| 4,252,107 | 2/1981 | Horton ............................... 126/438 |
| 4,354,484 | 10/1982 | Malone et al. ..................... 126/425 |
| 4,361,758 | 11/1982 | Rotolo ............................ 250/203 R |

FOREIGN PATENT DOCUMENTS

| 2802167 | 7/1979 | Fed. Rep. of Germany ...... 126/425 |
| 2931964 | 2/1981 | Fed. Rep. of Germany ...... 126/425 |
| 2484096 | 12/1981 | France ............................. 126/424 |

Primary Examiner—Samuel Scott
Assistant Examiner—Margaret A. Focarino
Attorney, Agent, or Firm—Wofford, Fails & Zobal

[57] ABSTRACT

An improvement in a system and method of controlling heliostat in which the heliostat is operable in azimuth and elevation by respective stepper motors and including the respective steps or means for calculating the position for the heliostat to be at a commanded position, determining the number of steps in azimuth and elevation for each respective motor to get to the commanded position and energizing both the azimuth and elevation stepper motors to run in parallel until predetermined number of steps away from the closest commanded position in azimuth and elevation so that the closest position has been achieved, and thereafter energizing only the remaining motor to bring it to its commanded position. In this way, the heliostat can be started from a stowed position in the morning and operated by a computer means to its commanded position and kept correctly oriented throughout the day using only the time of the day without requiring the usual sensors and feedback apparatus. A computer, or microprocessor, can then control a plurality of many heliostats easily and efficiently throughout the day.

2 Claims, 22 Drawing Figures

FIG. 5

1. START
2. Initalize Stack / Disable Timer
3. Set Port A To Output
4. Set Port B To Input
5. Set 6850 to 8 bits 2 step Bits Receiver Interupt
6. Set Registers for 5 byte xmit 6 Byte recive
7. Clear All other Registers to 0
8. Test limits for opens
9/10. Limits open ? — YES → Set Status Register to Power Drop Out → (A)
   NO ↓
11. Set Motors for 2 steps CW
12. Call Motor Movement Routine
13. Test limits for closures → (B)

HELIOSTAT CONTROL

The Government has rights in this invention pursuant to Contract No. MDH 83-2729E awarded by the U.S. Department of Energy.

FIELD OF THE INVENTION

This invention relates to solar systems employing reflectors for reflecting radiant energy onto one or more collectors that convert the solar energy into usable energy. More particularly, this invention relates to an improvement in a control system and method of controlling the reflectors, or heliostats, to reflect the solar energy onto the collector.

BACKGROUND OF THE INVENTION

In the prior art there has been developed a wide variety of systems for producing useful work. Some of the systems, such as nuclear fission, suffered from bad publicity. Others such as conversion of energy content of substances such as wood, coal, and petroleum, are suffering from scarcity of the fuel and from pollution by the waste products of combustion. Consequently, there is increasing emphasis on the use of solar energy and similar readily available fuels that do not contaminate. The systems for using solar energy are referred to as solar systems. These systems have taken a wide variety of forms ranging from the photovoltaic cell systems that convert the radiant energy directly into electrical energy, to the more mundane systems that convert the energy to heat for heating of fluid for use in generation of power.

The photovoltaic systems have been relegated to fairly exotic uses heretofore because of the cost. Regardless of which system is employed, it is generally conceded to be beneficial to employ a concentrating principle in which the sun's radiant energy from a much larger area than the collector, per se, is directed, or focused, onto the collector that uses the radiant energy.

In a typical installation heretofore, the collector was mounted on an expensive tower or the like that held the collector high for directing the energy onto it; and many reflectors were spaced about the central collector and used sensors for directing the radiant energy onto the collector.

In a patent by co-workers Floyd Blake and Lynn Northrup, Jr. and assigned to the assignee of this invention, entitled "Solar System Having Improved Heliostat and Sensor Mountings", U.S. Pat. No. 4,227,513, the descriptive matter of which is incorporated herein by reference for details that are omitted therefrom, there was disclosed an improvement that eliminated the prior major expense of having to have the reflectors mounted on one post and the sensors mounted on another post, both of the posts being deeply embedded in the earth's surface such that they were firmly anchored and resisted receiving minor surface movements that were independent of each other. In that patent application there was disclosed an improved co-mounted reflector and sensor on a single post to eliminate that nonfunctional and inefficient expense.

Despite that improvement, it has been found functionally, flexibly, and economically advantageous to eliminate the sensor, per se; and to control the heliostat by a computer that calculates a commanded position to which the heliostat is moved in azimuth and elevation for a given time of the day.

From the foregoing, it can be seen that the prior art did not solve the problem of providing the most economical, most accurate, and most flexible way of controlling heliostats to reflect solar energy onto a collector when multiple heliostats were employed in an array of many heliostats about a collector (such that many sensors and control circuits would be required.)

SUMMARY OF THE INVENTION

Accordingly, it is an object of this invention to provide a control system that is more economical and more flexible than the prior art systems by eliminating the nonfunctional and inefficient major items of expense; and to provide a method of controlling the heliostat flexibly and cost effectively.

It is a specific object of this invention to provide an improvement in a solar control system in which there is employed a plurality of heliostats maximizing the use of radiant energy from a large surface area and flexibly controlling the individual heliostats economically, alleviating the deficiencies of the prior art and providing a method that can be readily altered as needed for more efficient control.

These and other objects will become apparent from the descriptive matter hereinafter, particularly when taken in conjunction with the appended drawings.

In accordance with one embodiment of this invention, there is provided an improved heliostat control system. The typical system will include a target collector for collecting the solar energy and converting it to usable energy and a plurality of heliostats supported and each movable by respective motors in azimuth and elevation for reflecting the solar energy onto the collector. The improvement is characterized by monitor means for monitoring a current position of a respective heliostat; computer means for computing a command position for a respective heliostat to be at a particular time of day; cumulating means for determining the computed number of steps for respective stepper motors in each of the azimuth and element circuits to reach the commanded position; respective azimuth stepper motors; respective elevational stepper motors; energizer means for energizing the respective motors of a given heliostat, the energizer means being connected with the cumulating means and the stepper motors and adapted to operate selectively both stepper motors and thereafter either of the stepper motors; and comparator means for comparing accumulated steps to commanded steps. The comparator means is connected with the monitor means, the computer means, the cumulator means, and the energizer means and is adapted to stop both the motors a predetermined number of steps away from the commanded number of steps to allow deceleration from slewing speeds so that the closest motor reaches its commanded position and thereafter to energize the remaining motor to attain its commanded position and stop a predetermined number of steps away from its commanded position.

In accordance with another embodiment of this invention, there is provided a method of controlling a plurality of heliostat to reflect solar energy onto a collector including moving the heliostat in azimuth and elevation by respective motors. The improvement is characterized by calculating a command position for the heliostat at a particular time of day, accumulating the number of steps in azimuth and elevation for each motor to get from the present position to its commanded position, energizing both the azimuth and elevation stepper motors to run in parallel until a predetermined number of steps away from the commanded position of the closest of the azimuth and elevation motors, thereafter deenergizing the motors to allow deceleration from slewing speeds, operating both motors in parallel until the closest of the azimuth and elevation motors is at its commanded position; and thereafter energizing the remaining motor to bring it to its commanded position.

BRIEF DESCRIPTION OF THE DRAWINGS

FIGS. 5–22 are detailed flow charts for the heliostat controller connected to work cooperatively with the mini heliostat array controller.

DESCRIPTION OF PREFERRED EMBODIMENTS

It is to be borne in mind that this invention is usable in many applications in which a predetermined commanded position can be calculated from time input data such as the time of day. It will be explained in the context of controlling a heliostat to reflect the solar energy onto a collector target, since it is in this environment that it has been developed and tested.

It is well known, for example, that for a given location on the surface of the earth, the line to the sun will have a direction in azimuth and elevation that is predictable by an observer at the surface of the earth. There is also a line from a given heliostat to the collector on to which the sun's energy must be reflected. The line perpendicular to the surface of the heliostat mirrors reflecting the solar energy onto the target collector will bisect the angle between the line to the sun and the line to the collector. Consequently, that position of the heliostat can be calculated from its location on the earth and the time of day, month and year. Many approaches have been employed calculating the position of the heliostat and it is relatively immaterial to this invention which of the prior art approaches be employed. For example, the Cordic algorithm is well known and is frequently employed in calculating the command position for the heliostat. Other ways are to simply measure the line angle to the target and obtain the line angle to the sun from tables for the given location, and then bisect the intermediate angle to determine the position for each point of the day. These types of empirical observational charts are readily available for most general areas of the world and can be extrapolated or made up for the specific area in which each heliostat is located.

Figure 1:
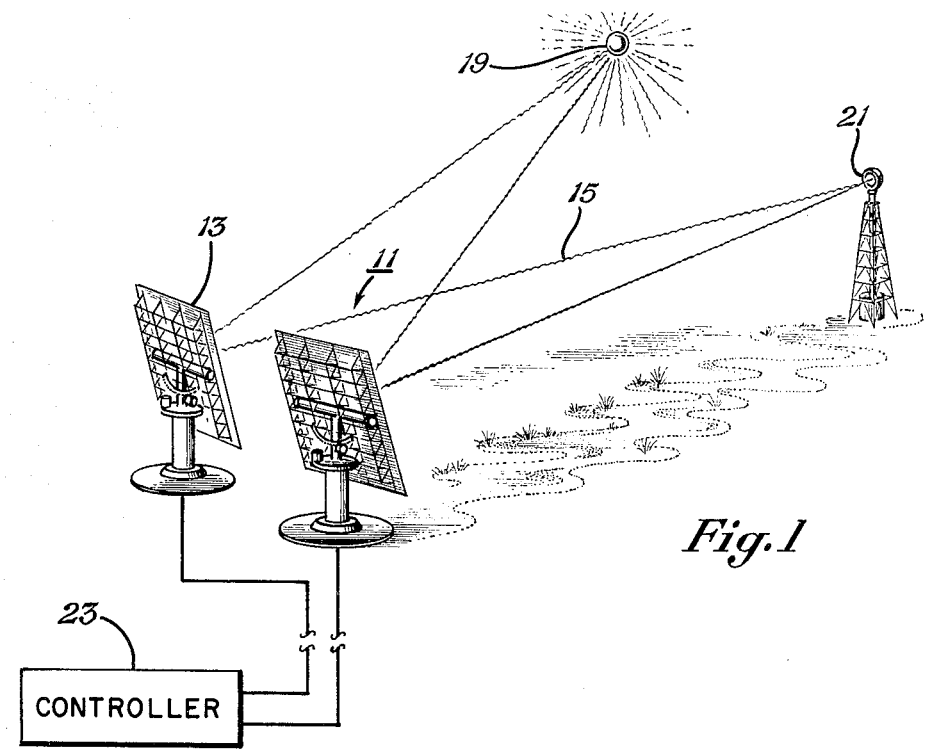
FIG. 1 is a partial respective view illustrating the principle of this invention.

Referring to FIG. 1, heliostats 11, 13 are emplaced on suitable pedestal supports or the like such that they can be pivoted to change their azimuth. They are mounted so they can be rolled forward and backward to change their elevation. This allows achieving any desired position to reflect solar energy, shown by ray 15 from the sun 19 onto collector 21. The controller 23, FIG. 1, determines the position that the heliostat is to be and sends control signals to rotate the stepper motors that are employed on the operational azimuth and elevation structure to effect reflection of the solar energy onto the target 21.

It is believed helpful to delineate the operational steps in broad form before considering the specifics. The controller 23 obtains data from a data bank showing the time of day, month, and year and calculates the position for the heliostat to be in terms of command azimuth and elevation angles. The heliostat is initially activated, ordinarily from a predetermined stow position at a limit switch. As the control circuits are initialized by a master computer at the stowed position the number of steps the computer is to be moved is accumulated for each of the motors in azimuth and elevation. There are two separate accumulators for this purpose. A comparator means compares the accumulated steps to the commanded steps. The motors are energized to run through a predetermined number of steps at a low speed; for example 500 steps per second and stopped. This checks out the circuitry to be sure that the motors move the heliostat off the limit switches and allow checking to be sure everything is in a "go" condition. Thereafter, the number of steps is decremented (subtracted) from the cumulative steps through which the respective azimuth and elevational motors have to move to attain the commanded position. The motors are both energized, allowed an accleration profile shown by the slanted line 25 in FIG. 2, and then run at 1500 steps per second to a predetermined number of steps away from the closest stop position of one of the motors in azimuth and elevation. Thereafter, the deceleration profile 27 is allowed before the motors are brought to a stop for a predetermined interval. After the predetermined time interval the remaining motor that was fartherest away from its control position is energized as shown by the profile 29. It is brought into its correct commanded position for positioning the heliostat at its commanded position for reflecting the solar energy onto the target collector 21. For example, the signal to stop may be at 100 steps away from the desired positions such that the motor has time to decelerate from its slewing speed and stop on the commanded position. Of course, if the comparator means determines that the motor has not stopped on exactly its commanded position, it can be energized and brought into its commanded position.

Figure 3:
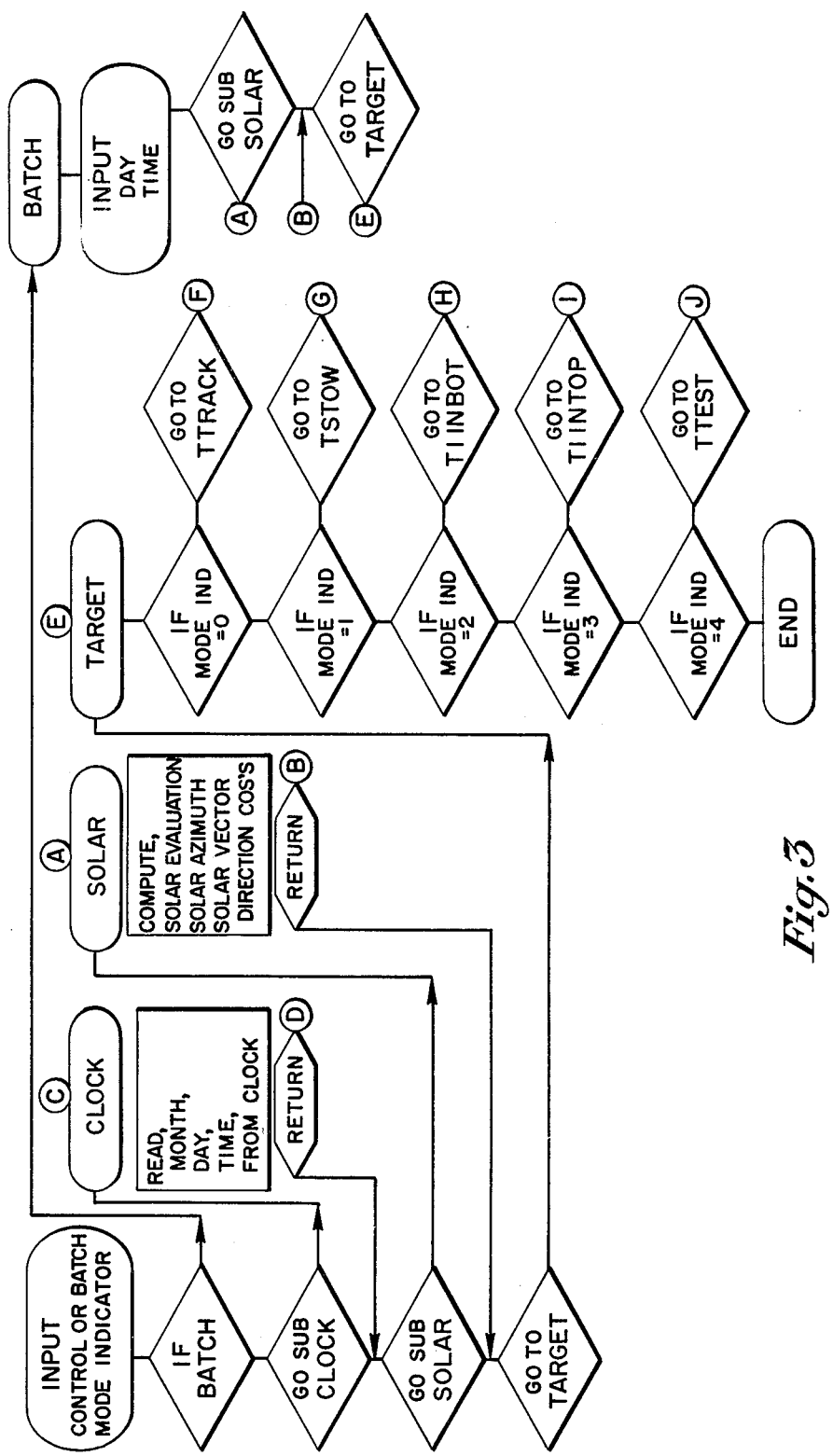
FIGS. 3 and 4 show a broad flow diagram for a mini heliostat array controller performing the functions generally associated with a master controller, a heliostat array controller, and a field controller.
Figure 4:
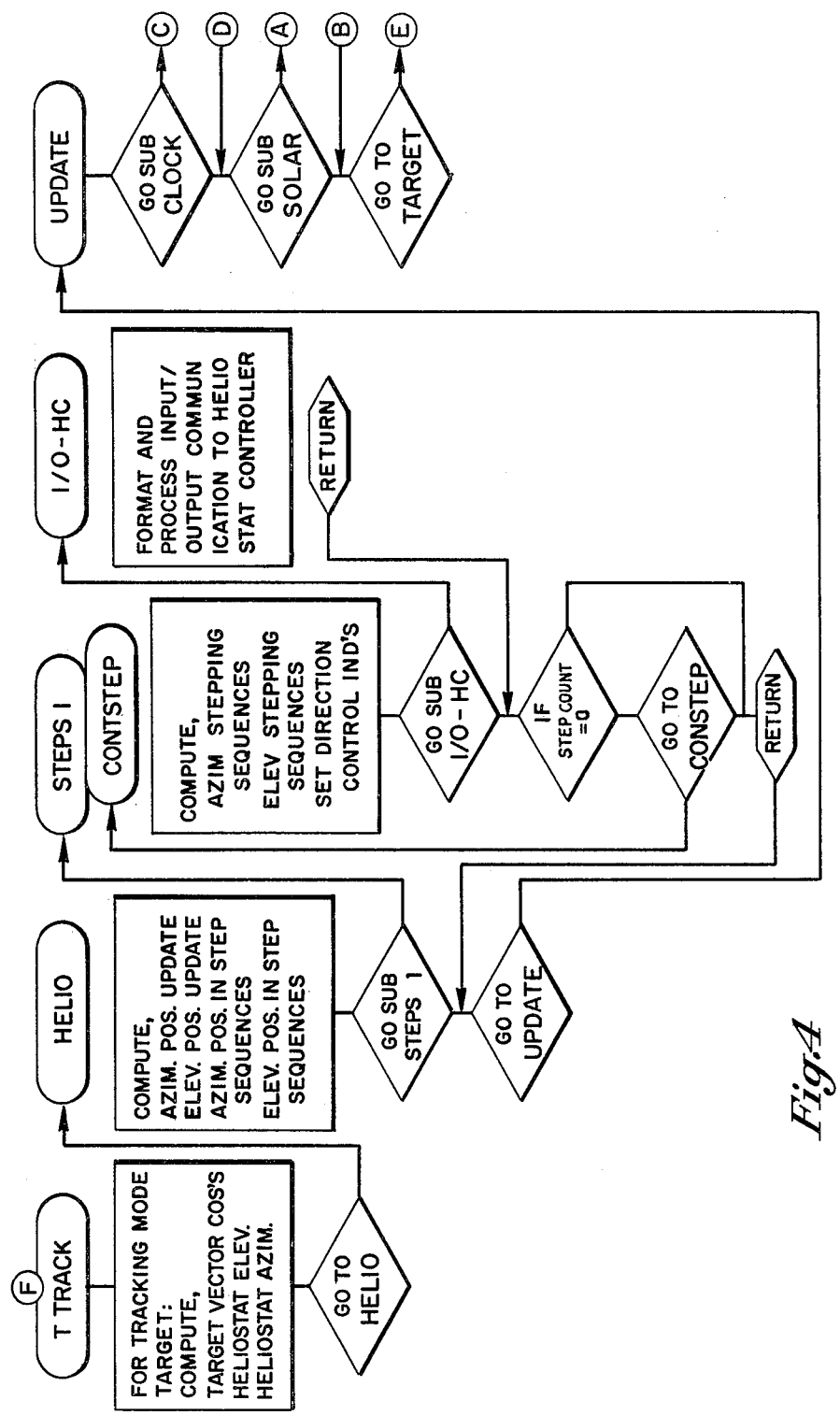

Referring to FIGS. 3 and 4, now there is illustrated a somewhat amplified flow diagram for carrying out the method as described hereinbefore. It is believed helpful to consider control hardware performance before looking at the software.

The controller 23 requires serial data in the format of address, azimuth, elevation, and mode words. The azimuth and elevation position commands consist of two bytes each (most significant and least significant respectively). Each byte consists of one start bit, two stop bits, eight data bits, and no parity bits. The controller 23 times out after 1.5 bytes if data transmission is lost. The controller 23 keeps track of the total number of step commands and transmits its current position based on the reference position established upon "power up". Upon receiving a absolute position command the controller 23 substracts its commanded position from its current position and outputs the appropriate number of steps.

The controller consists of two packages, one handling the external data processing communication and control and the other handling the internal data processing communication and direct motor control.

The heliostat mode is controlled by the mode byte which determines track, slew, request for status, and clear malfunction.

The controller 23 checks limit switch status upon "power up" and sets a status bit if the switches are in a stow position, or condition. The controller 23 returns position and status information upon request. The status word consists of limit switch indications, motor movement, wake-up malfunction, and power drop out information.

Figure 2:
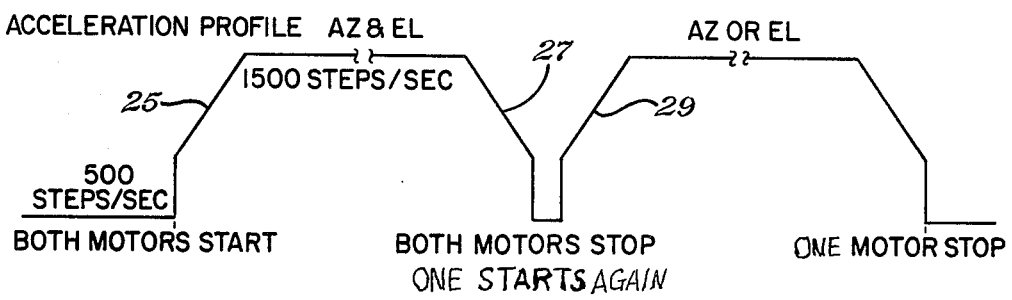
FIG. 2 is a schematic illustration of the method of this invention.

The stepper motors require acceleration and deceleration in order to reach slewing speeds. This is a normal requirement of stepper motors and is needed to overcome inertia without losing steps. The profile for acceleration and deceleration for azimuth and elevation stepper motors is illustrated in FIG. 2 as indicated hereinbefore. In accordance with this invention, the two motors are moved to a new position simultaneously that is, they accelerate in parallel and both decelerate until the position of the closest motor is reached. After both motors stop, the motor requiring additional position movement resumes normal operation, as indicated hereinbefore.

The first one of the packages is referred to herein as the mini heliostat array controller (mini-HAC) and it performs those functions generally associated with a master control, heliostat array controller, and a field controller. The master control features of the software include providing the system time reference, the corresponding solar vector definition, and the target coordinates as a function of the operating mode. FIG. 3 shows these major software elements in their schematic linkage. Any of the microprocessors can be employed as the desk top computer. These range from the elaborate microprocessors that are currently available down to the Hewlett Packard 9825. The compatable peripherals are employed such as the clock, CRT/RS232 serial I/O/IEEE488-1975, parallel I/O, plotter, printer, and disk storage.

In the initializing sequence shown by FIG. 3 the controller interrogates the clock for month, day, and time, computes the solar vector cosigns, and establishes the subroutine to be processed for the assigned mode.

The operating segment of the software is illustrated in FIG. 4 and includes the tracking mode subroutine "T TRACK", computes the target vector cosigns, the required heliostat angles, the magnitude of the motor operation sequences needed to reach the required position, and processes the operating mode data to the heliostat control electronics. The operating software continuously cycles through an update and reposition sequence until interrupted by the controller 23.

Status information is obtained directly from the heliostat control electronics by the controller through a parallel communications bus and is recorded on a disk file and displayed on both the CRT and hard copy plots.

The detail flow diagram for the heliostat controller electronics is illustrated in FIGS. 5-22. Upon receipt of a six word message from the controller, the heliostats check the first word for being the applicable address and then either implement the control action defined in the remaining five words or stand by for the next message. Two words define the azimuth position requirement, two define the elevation position requirements, and the last word sets the HCE mode. Motor speed and the direction are controlled by bits in the mode word in addition to the basic mode action (operate motors or transmit status).

Referring to FIGS. 5-22, there are illustrated black numerals beside the respective blocks in the program and these numerals will be employed in descriptive matter hereinafter to set forth what is being accomplished by the software.

In the starting section, numbers 1-7, FIG. 5, the "power on" reset is checked, the processor will vector to the start of the program. The first task is to initialize the programmable hardware, internal position, and status control bytes.

In the sections 8-10, after initialization, the program will test the home limit switches to see if the mirror was stowed at the home position. If the limits are open then it will be assumed that the power has been lost at some time during mirror control. If this case has been detected then the power drop out bit will be set in the status byte.

Figure 6:
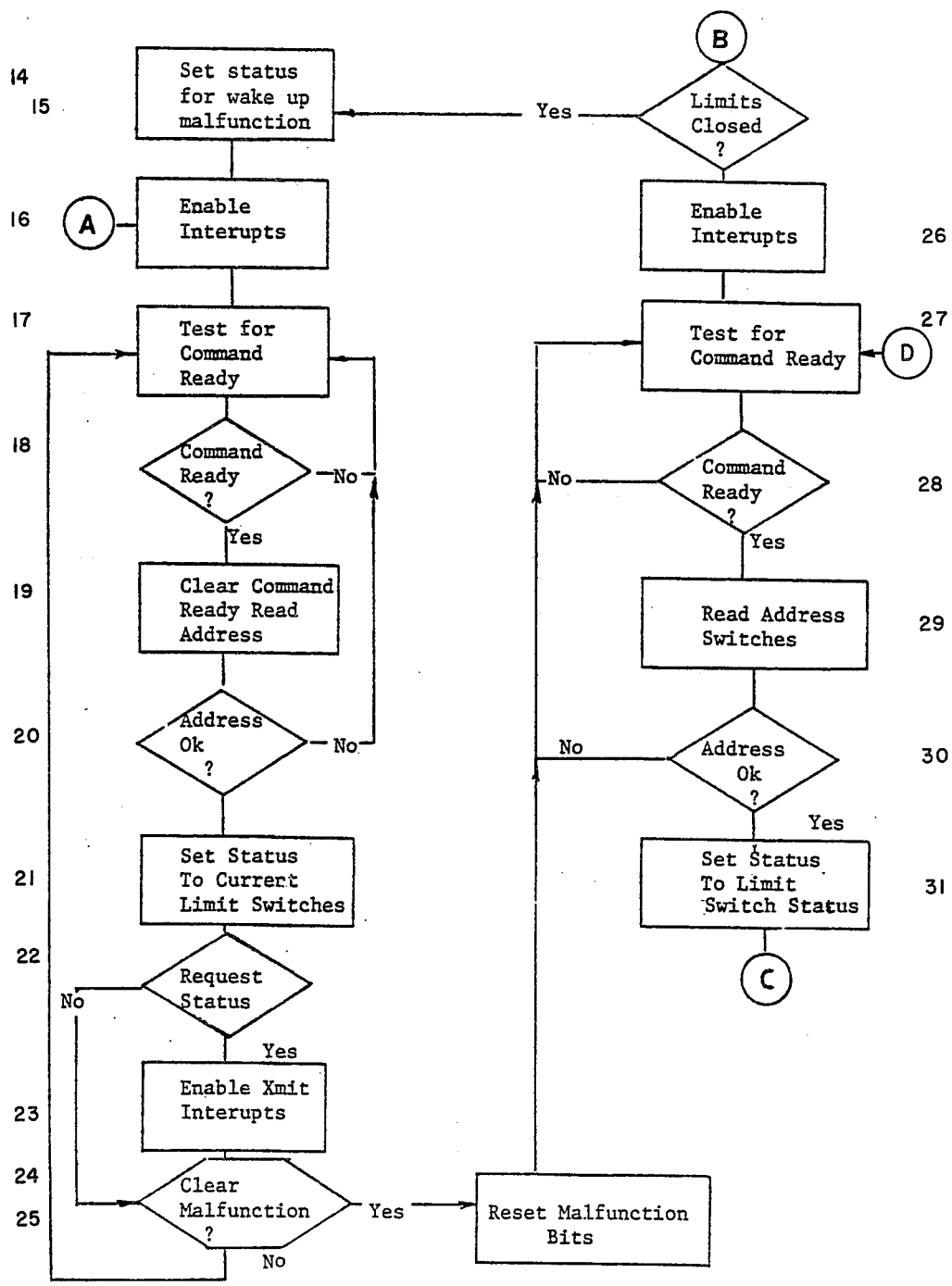

With respect to the numbers 11-15 in FIGS. 5 and 6, if the mirror is at the home position, then the program will try to move the mirror two positions off the limit switches. This will test the motor operation and limit switches for malfunction. If the limits do not open then the wake up malfunction bit will be set in the status register.

With regard to the blocks between number 16 and 25 in FIG. 6, if a malfunction has occurred, then the program will allow commands to be received but will only recognize a request for status or a reset of the malfunction status or both. A reset of the malfunction status shall transfer the program control to normal command operation.

With respect to the blocks between the numbers 26 and 31, FIG. 6, in normal command processing the program shall wait for a command to be fully received before decoding takes place. After a command is received the first test is for the proper device address. If the address is incorrect, then it will clear the command to ready and return and wait for the next command to be received. If the address is satisfactory then the status will reflect the current status of the limit switches.

Figure 7:
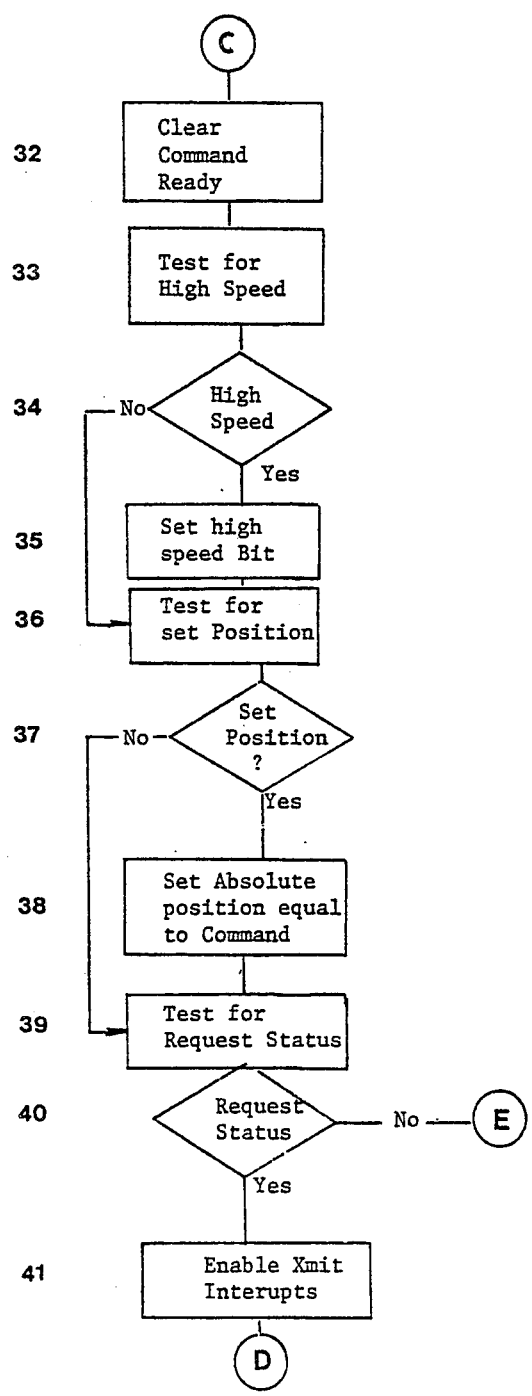

With respect to the blocks between numbers 32-38, FIG. 7, the next command will clear the command ready and then test for high speed operation. If high speed is requested then a bit will be set in the direction register. Set position is the next command to be decoded. If this is requested then the absolute position will reflect the command position.

With respect to the blocks between 39 and 41, if status is requested then the transmitter interrupt will be enabled and the current position and machine status will be transmitted. After this operation the program will transfer back to wait for command routine. Note this is shown at 41 by a D in a circle, which is also adjacent the number 27 in FIG. 6 to show that it goes back to that position.

Figure 8:
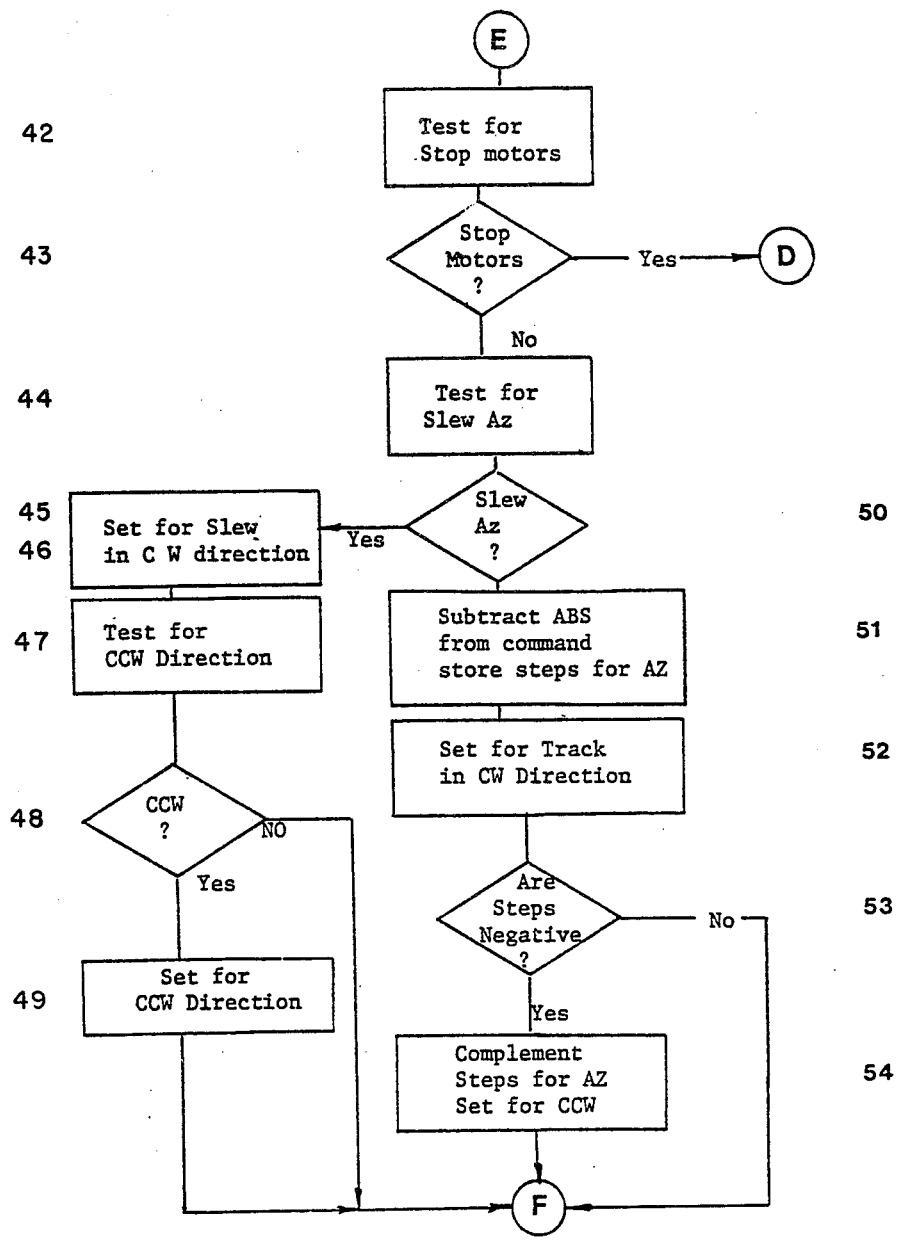

With respect to the blocks 42-49, FIG. 8, if the stop motors bit is set then the program will transfer back to wait for the next command. This is performed because slew direction cannot be calculated properly. Slew motor is the next test, and if set, then the motor direction is tested and the slew motor and direction bits are set in the direction register. With respect to the blocks 50-54, also FIG. 8, if tracking is requested then the absolute position is subtracted from the command position and the result is stored in the step registers and the direction register will be set for clockwise. If the result is negative then the step registers are complemented and the direction register is set for counter-clockwise. This operation is performed for both azimuth and elevation.

Figure 9:
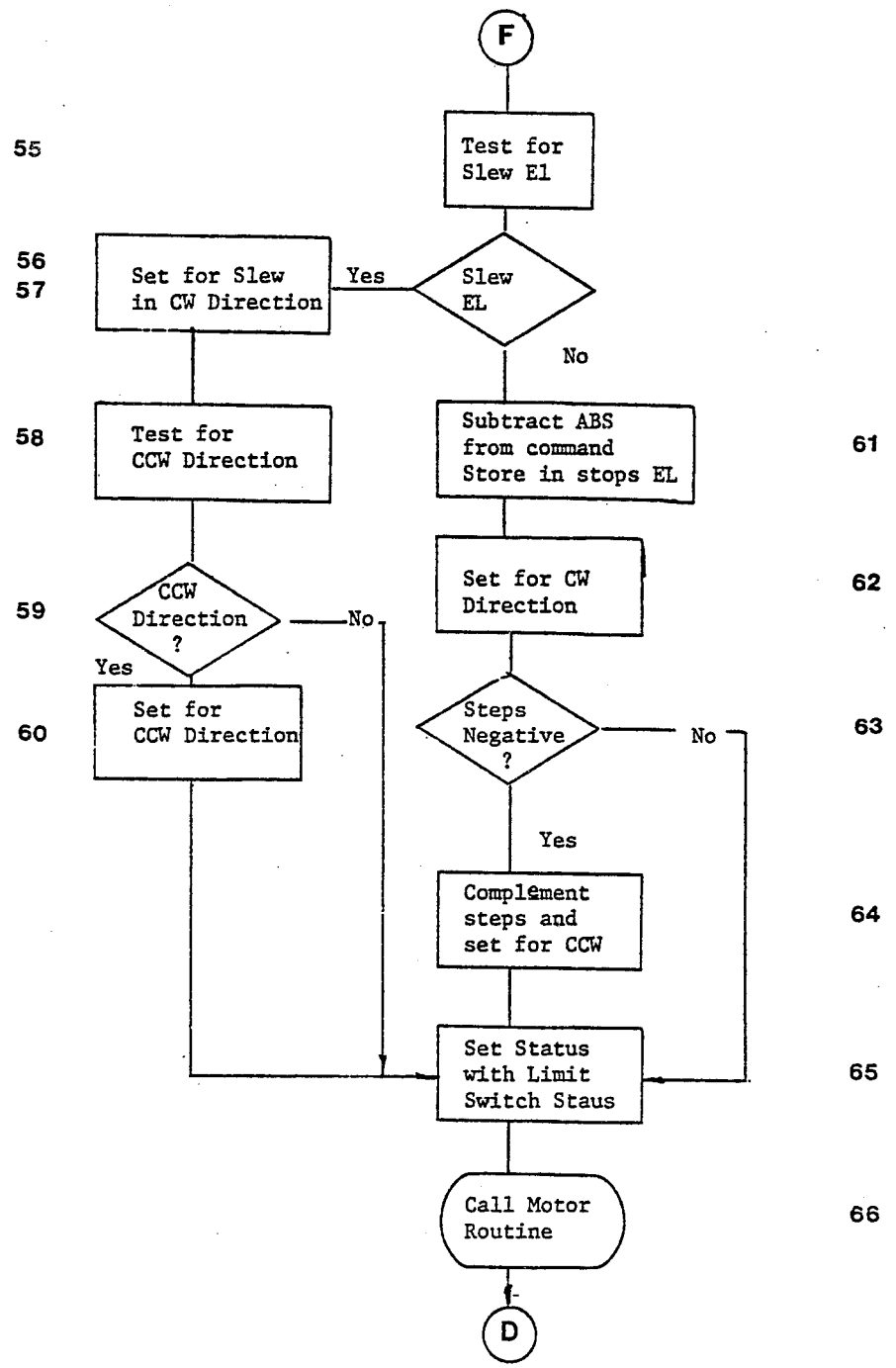

With respect to the blocks 55-56, FIG. 9, the status register is set with the limit switch status and then the program will call the motor movement routine, and then will return to wait for command routine. This is shown by the D within the circle.

Figure 10:
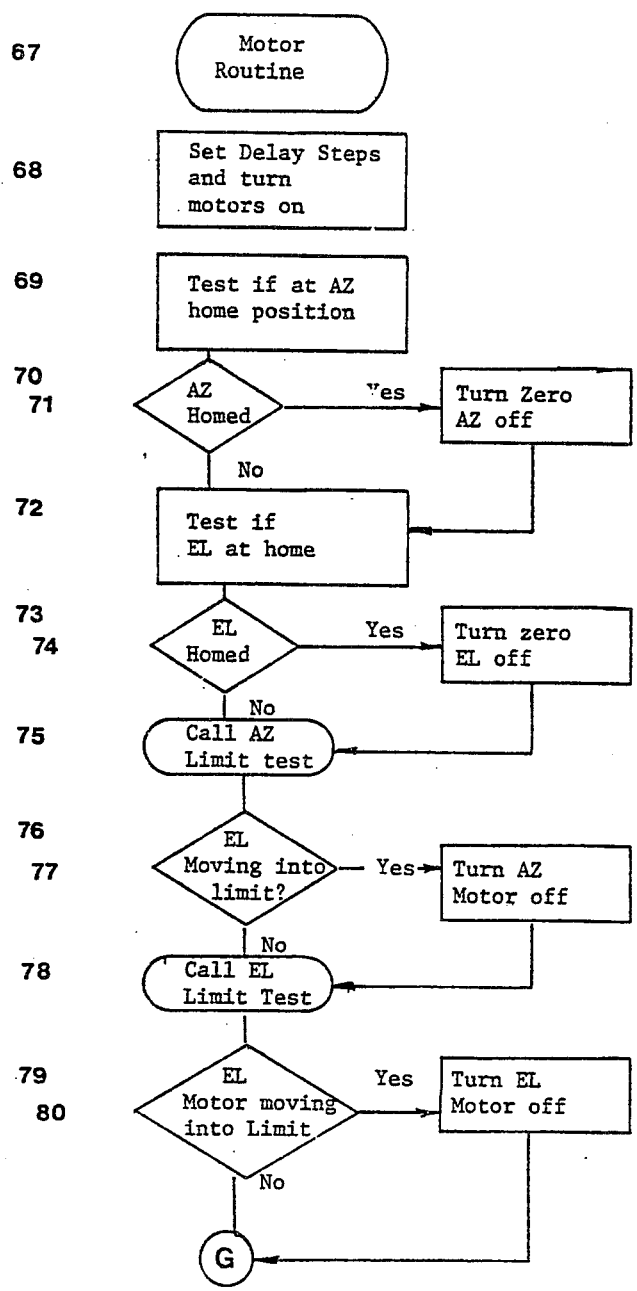
Figure 11:
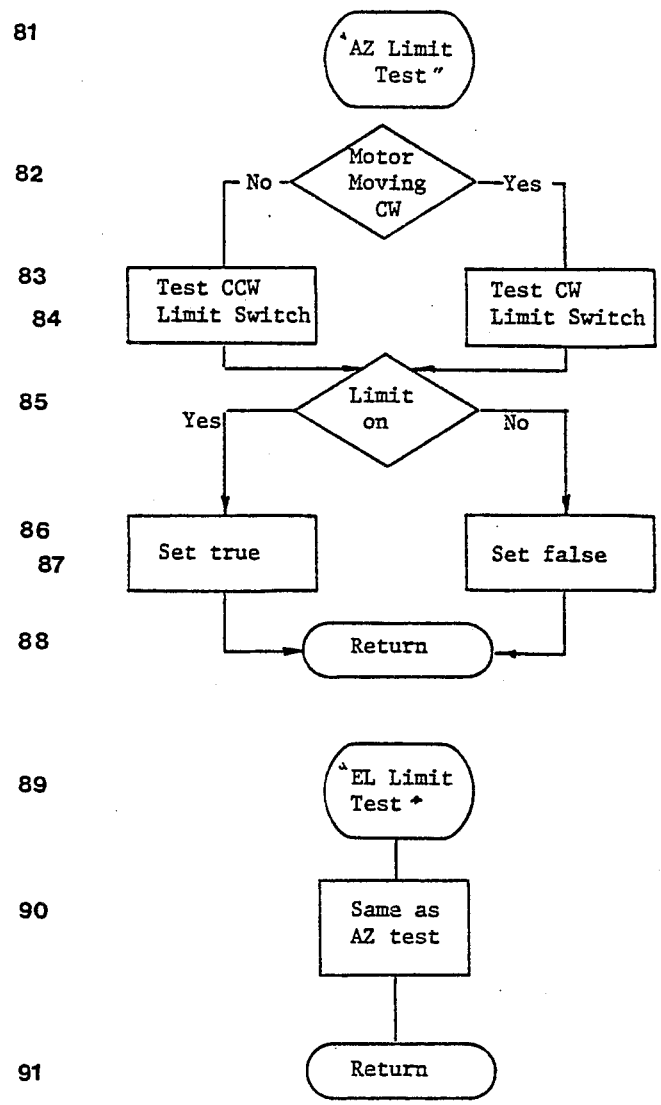

Referring to FIG. 10, the blocks between the number 67-80, at the start of the motor routine the computer will initialize the acceleration step register with the number of acceleration/deceleration steps. Both motors will be turned on and home position zeroing will be turned off for that motor. With regard to the box between the numbers 81-88, FIG. 11, the next test will check if the motor is moving into a limit switch. With respect to the blocks between number 89-91, if there is a movement into a limit switch then that motor is turned off.

Figure 12:
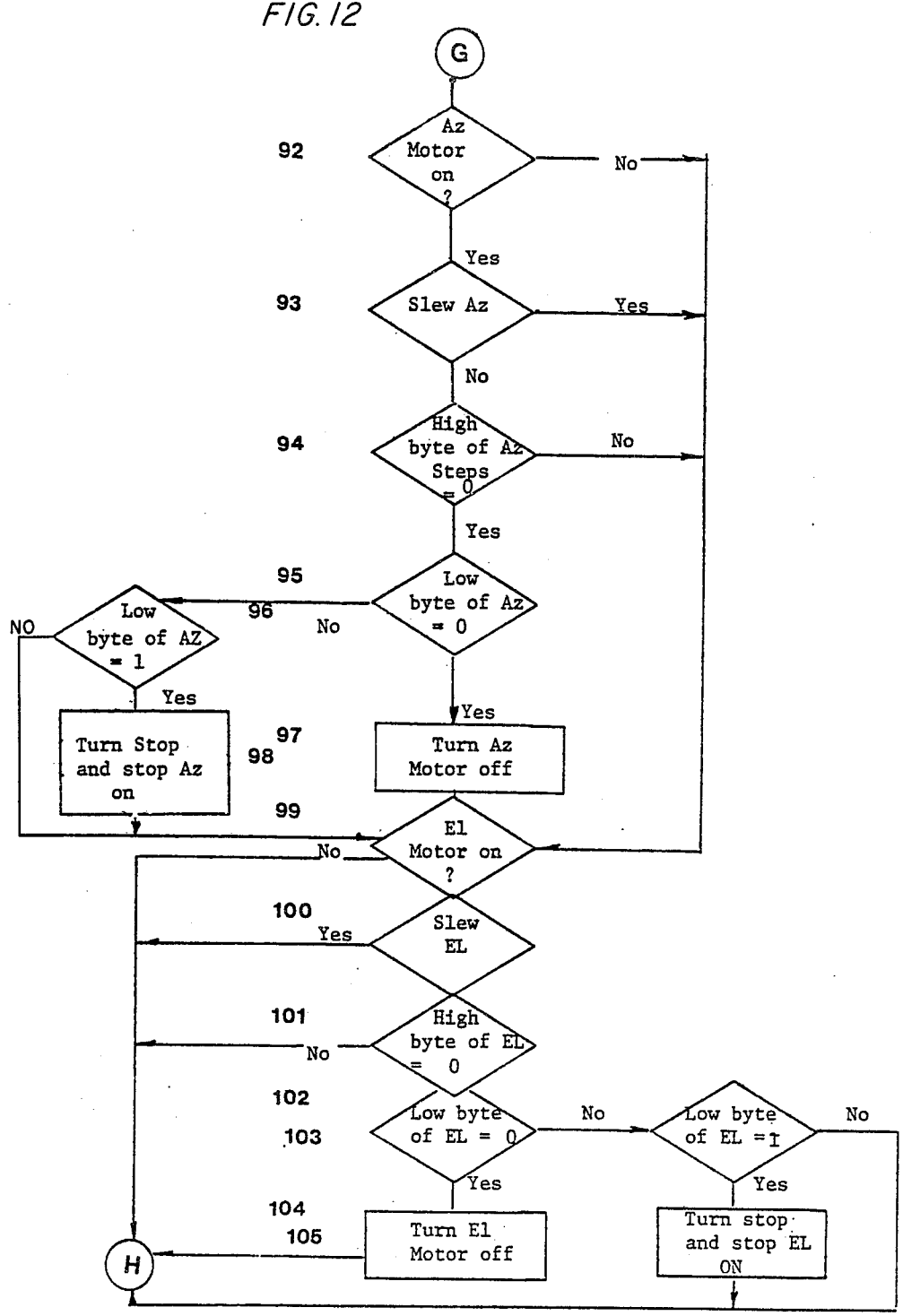

Referring to FIG. 12, the blocks between the numbers 92-105, the program will now test to see if there are any steps to be performed. If there are none then the motors are turned off. If only one step is to be performed then the step motor bit is set in the step register. If the motor is slewing then this step is omitted. If both motors are turned off at this time then the program will return to where it was called from.

Figure 13:
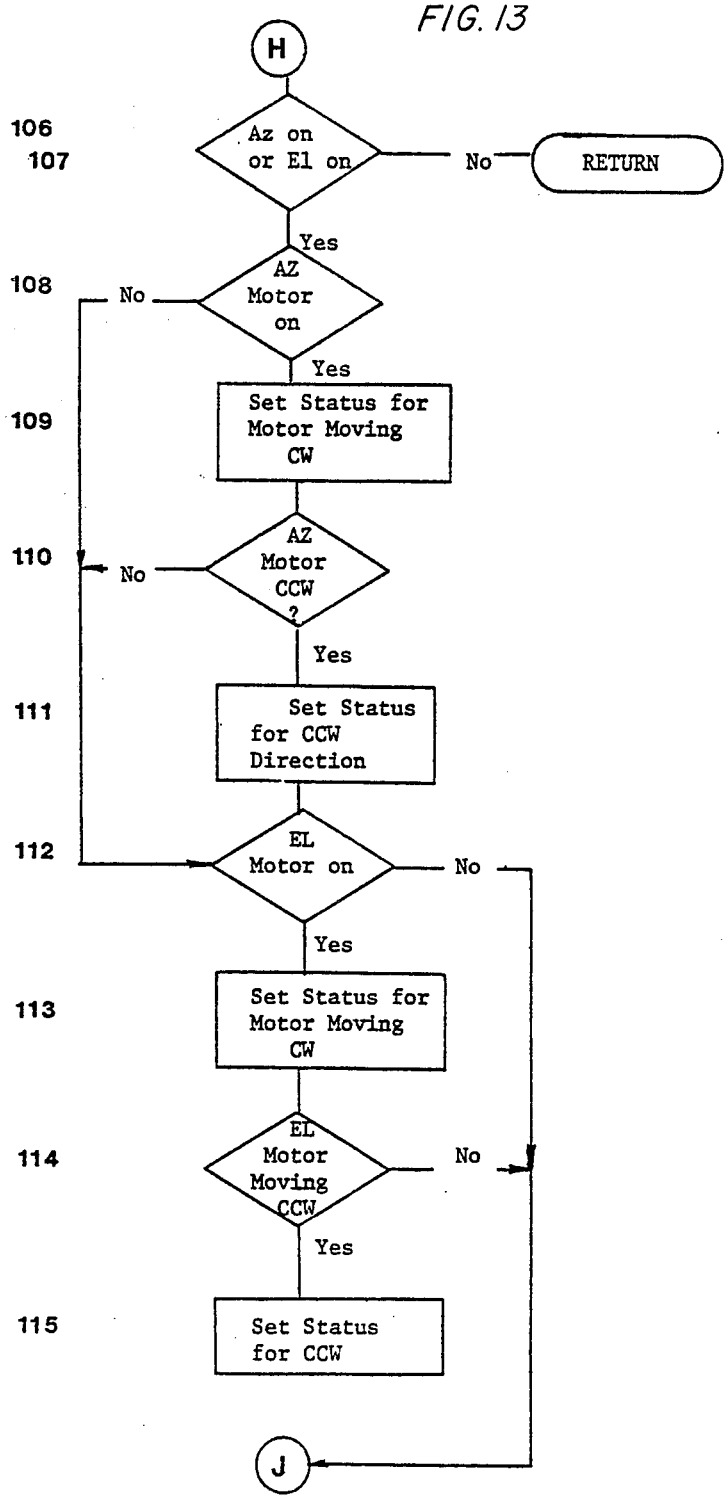

With regard to the blocks between the numbers 106 and 115, FIG. 13, the next operation will test the motor to see if the motor is on and if it is, then the computer will set the status register to indicate operation in the direction it is moving.

Figure 14:
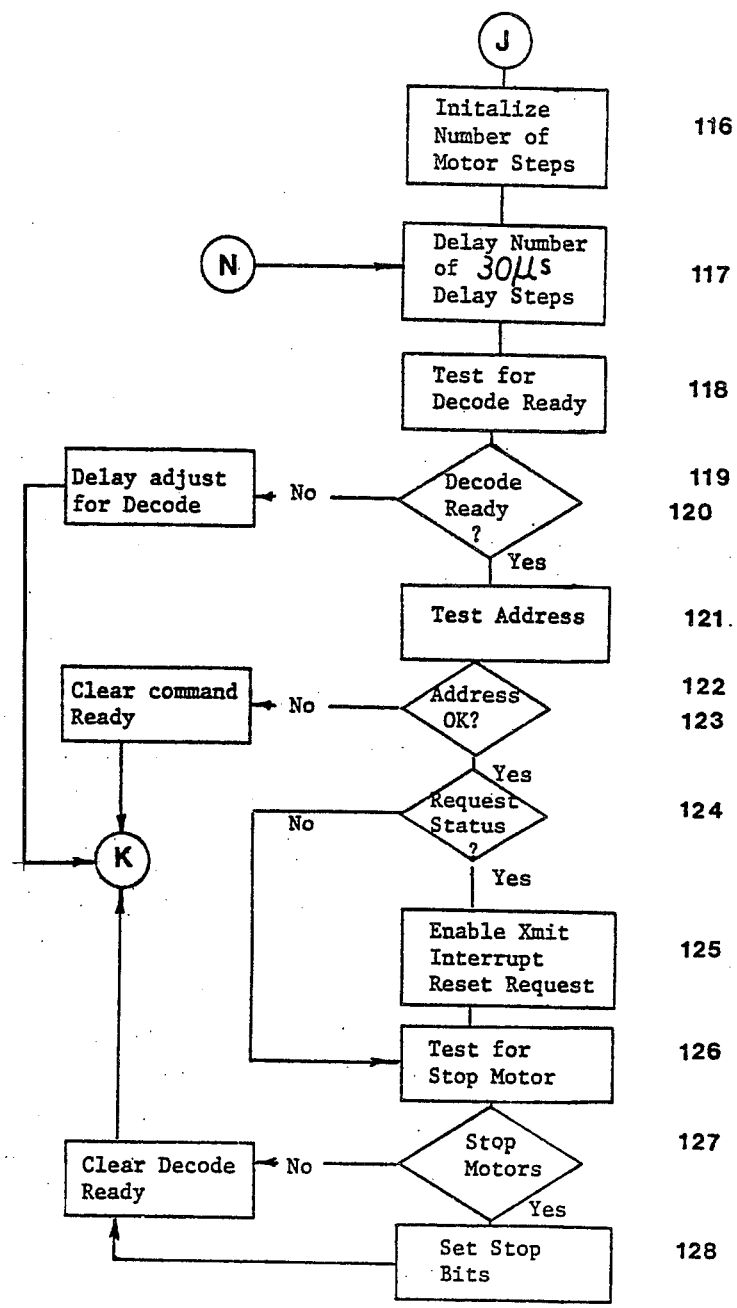

With respect to numbers 116-117, FIG. 14, the number of steps per position will be set at the start of the motor movement loop. At the start of the loop the program will delay 30 micro seconds for each acceleration step.

With regard to the numbers 118-128, a test will be made to see if a command was received during motor movement. If there was a command, then the program will test for proper address, status request, and stop motor command. If stop motor command is received then stop motor bits will be set in the stop register and the command ready bit will be reset.

Figure 15:
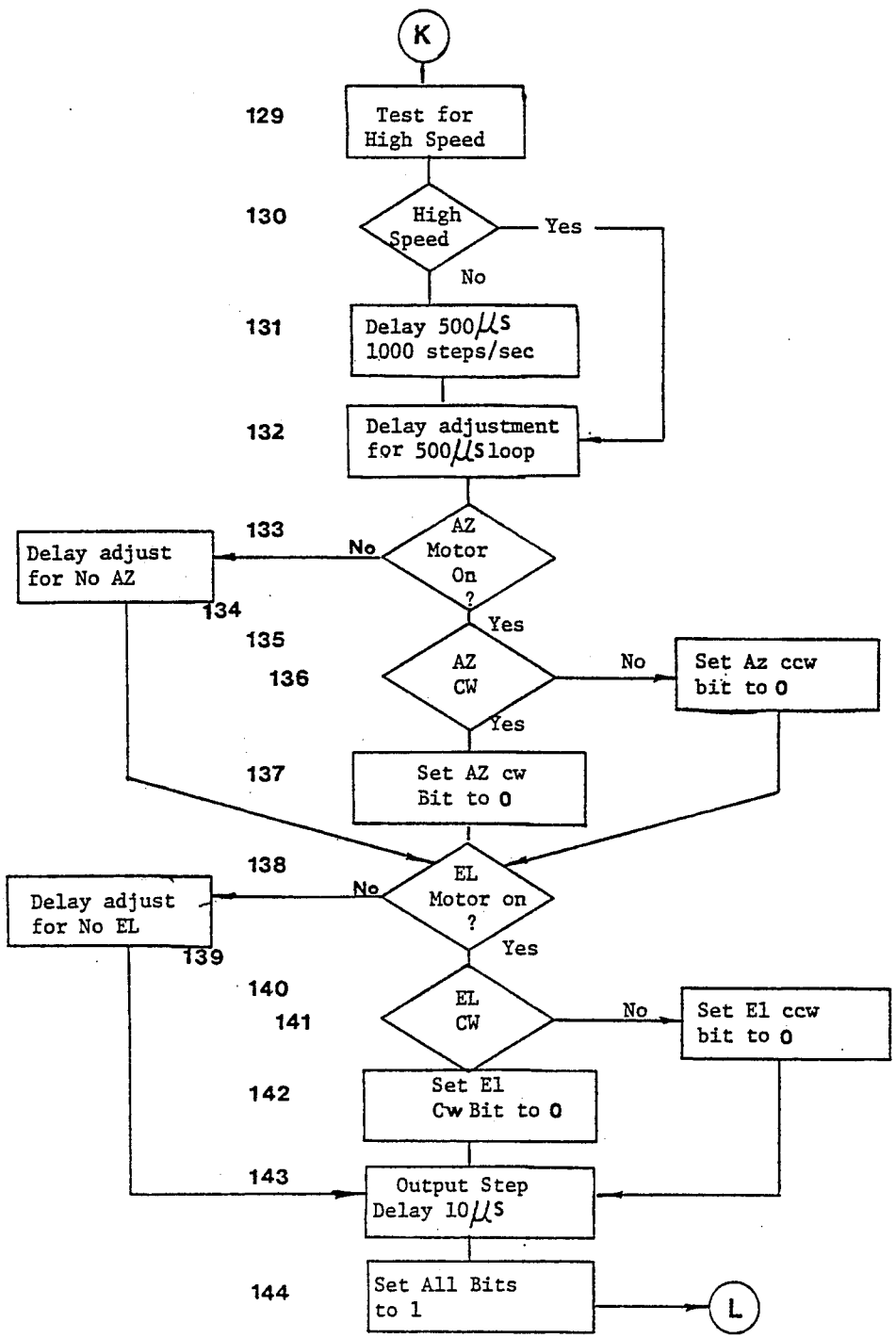

With respect to the blocks between the numbers 129-132, FIG. 15, the next test is for high speed. This bit is set, then the program will skip a 500 micro second delay for 1000 step per second timing to an adjustment for 2000 steps per second maximum speed.

With respect to the numbers 133-134, also FIG. 15, if the motor is on, then the program will test the direction register and will pulse either the clockwise or the counter-clockwise line for ten micro seconds. With respect to the numbers 145-152, after the step, a test will be made to check if the motor hit a limit switch. If the motor hit a limit switch, then the stop bit for that motor will be set in the numbers 145-152, FIG. 16.

Figure 16:
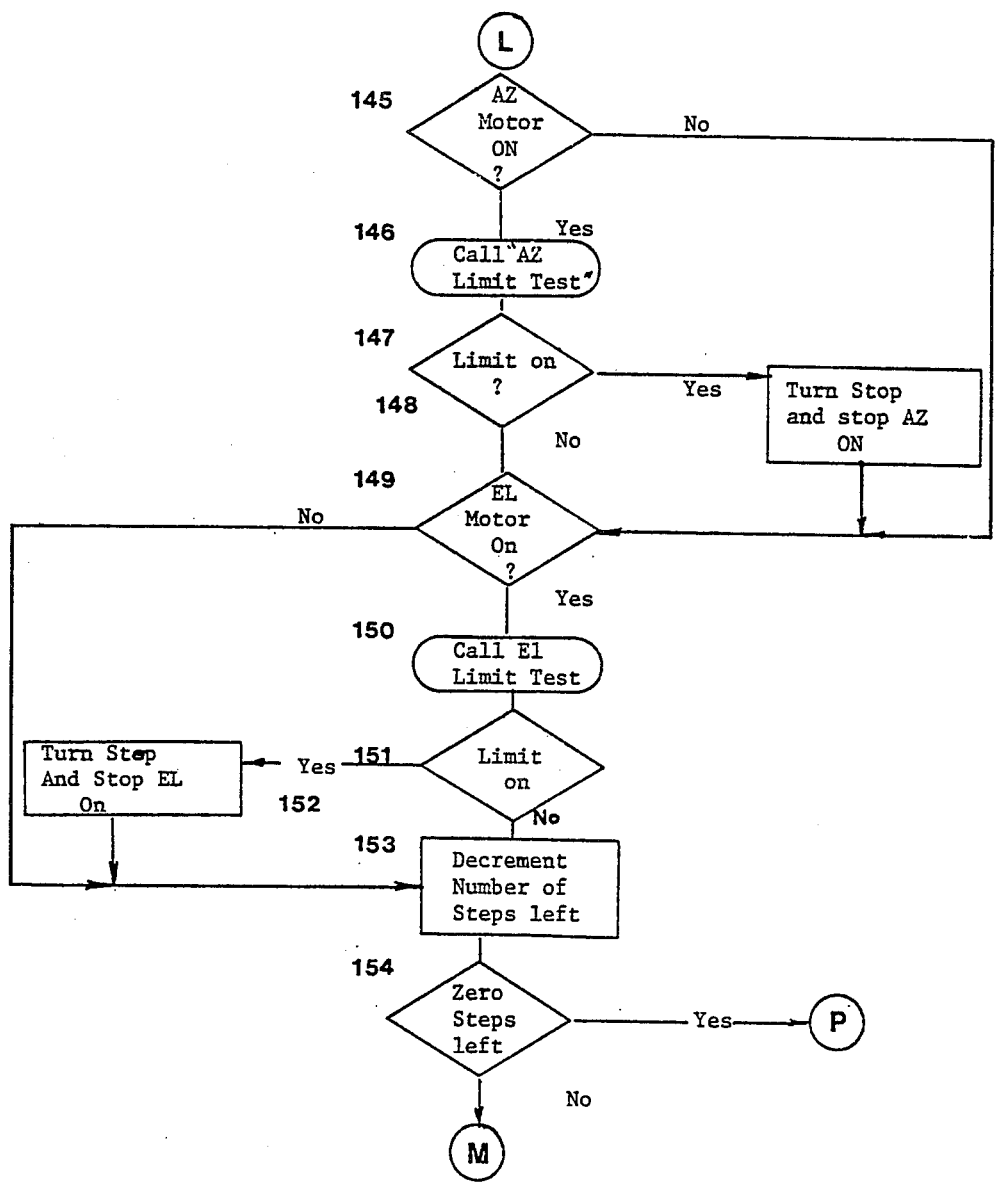
Figure 17:
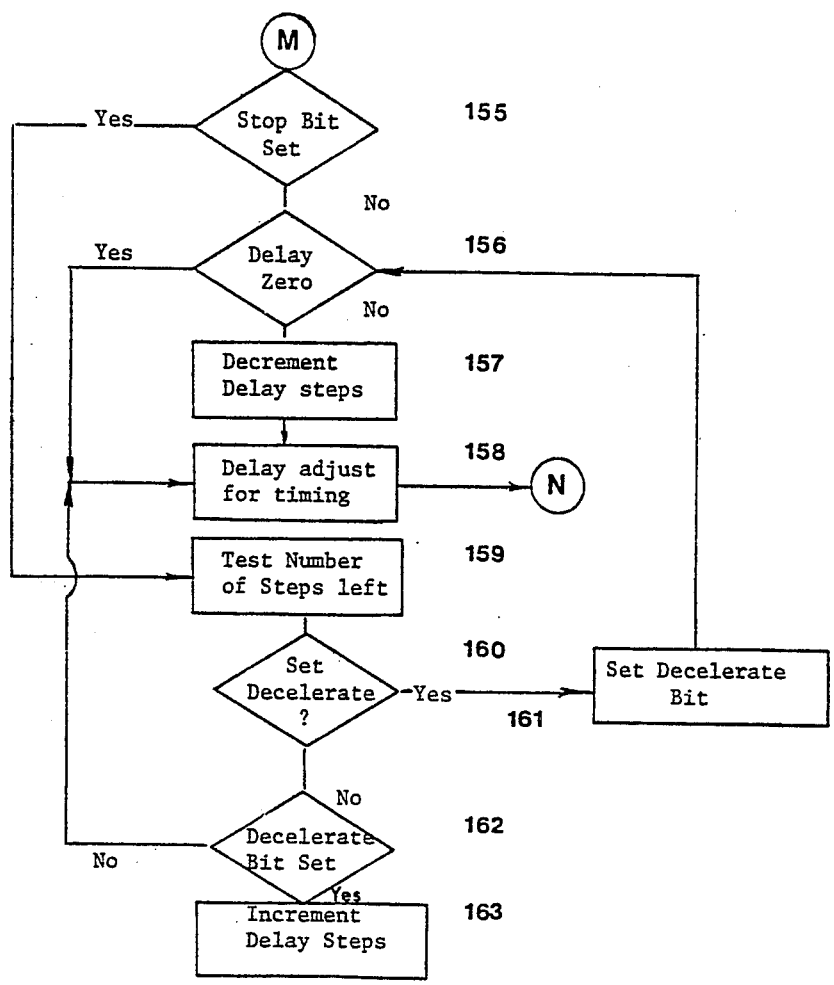

With respect to the numbers 153-163, FIGS. 16 and 17, the number of steps left will be decremented, or subtracted. If there are more steps left, then the program will test to see if any motors are stopping. If so, then the program tests to see if there are enough steps left to decelerate the motor. If there are, the program sets the decelerate bit. If the decelerate bit is set then the delay steps are incremented. If no motors are stopping then it tests to see if the motor is at maximum speed. If not, then the number of delay steps are decremented.

Figure 18:
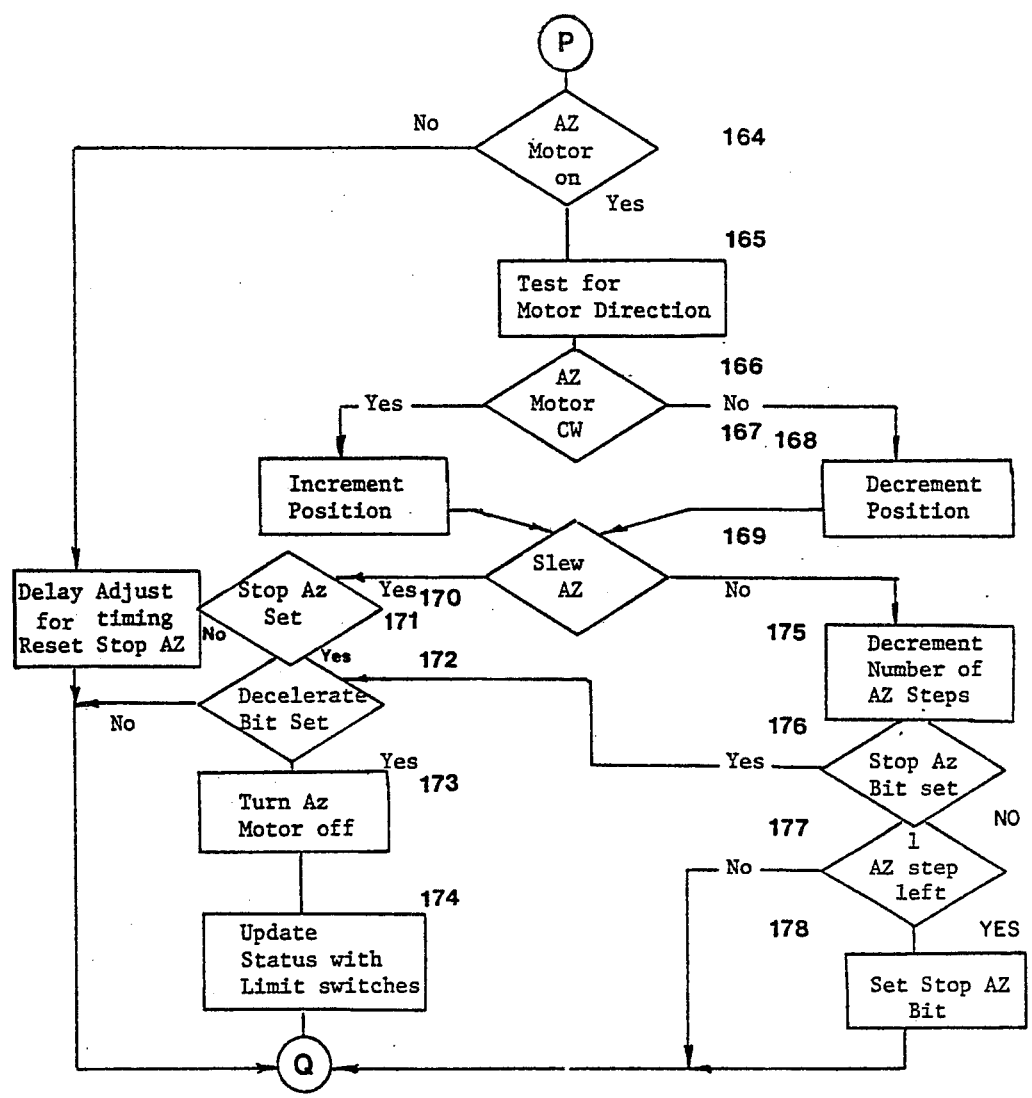
Figure 19:
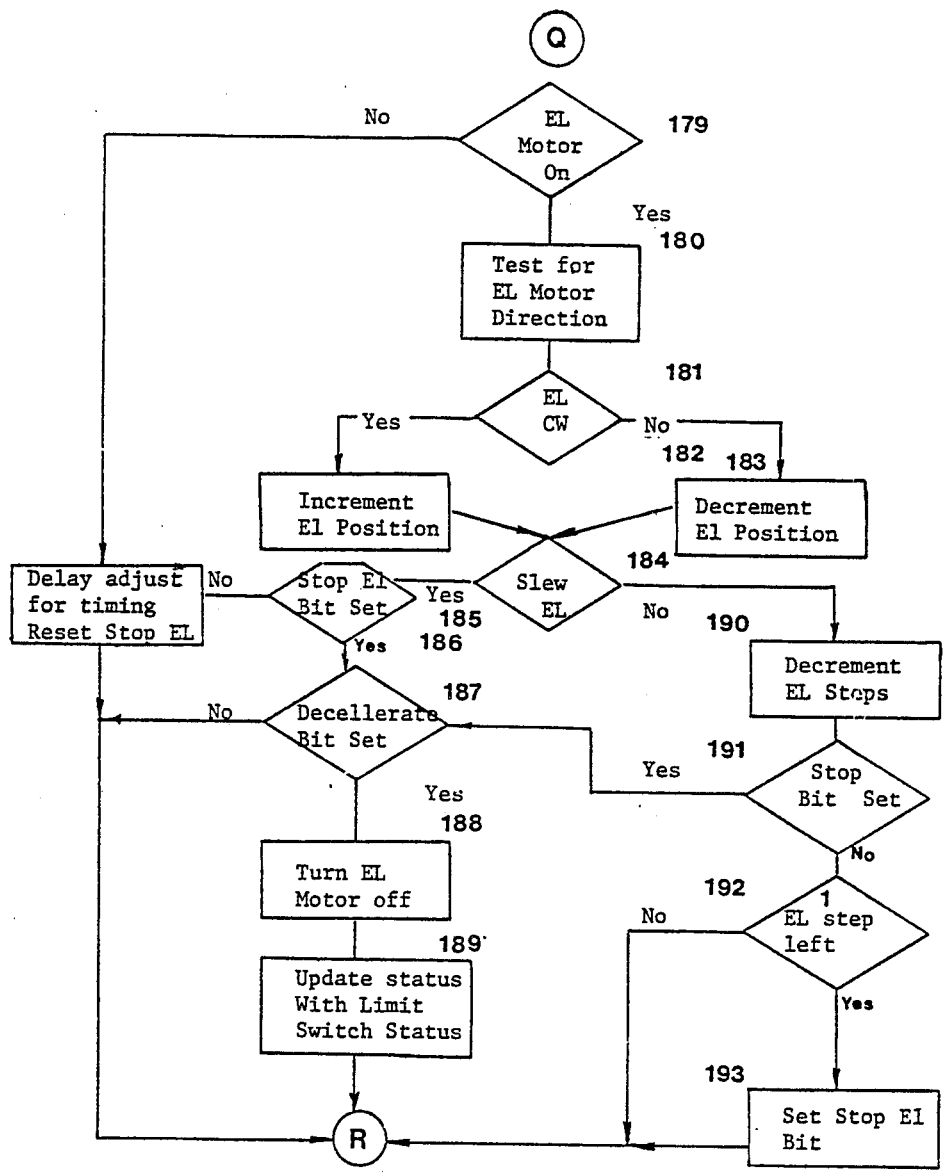

With respect to the numbers 164-168, FIG. 18, after 125 steps have been performed, then the absolute position will be incremented or decremented depending upon the motor direction. If the motor is not slewing then the number of position steps are decremented. If the stop bit is set then the program tests the deceleration bit.

With respect to the numbers 169-178, if the deceleration bit is also set then the motor is turned off and status is set to reflect the status of the limit switches. With respect to the numbers 179-193, FIG. 19, if the step bit is not set then the number of position steps left is one, then the stop bit is set. If the motor is slewing then a test is made on the stop bit. If set it makes the same test on the deceleration bit. If it is not set, the program continues.

Figure 20:
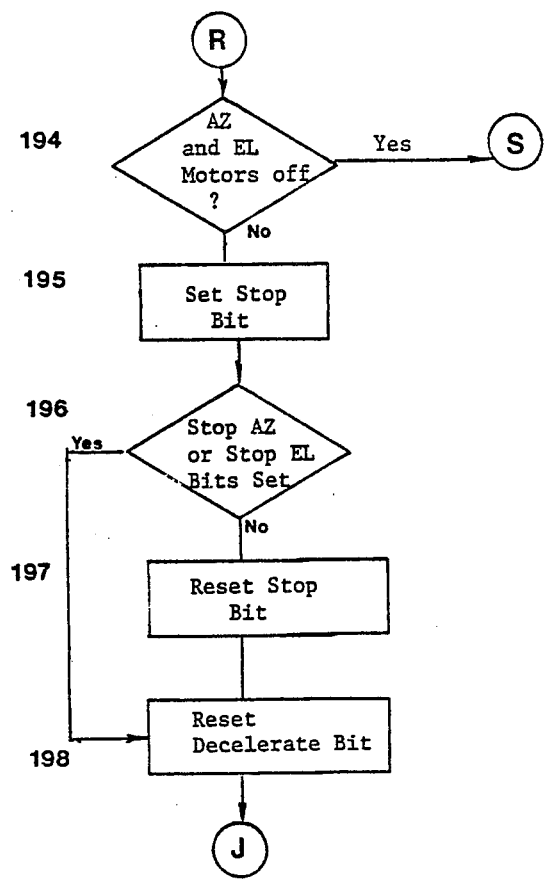

With respect to the numbers 194-198, FIG. 20, a test is made at this point to see if either motor is on. If they are then the deceleration bit and the stop bits are reset. If a respective motor was stopped, then the program transfers back to the start of the motor step loop.

Figure 21:
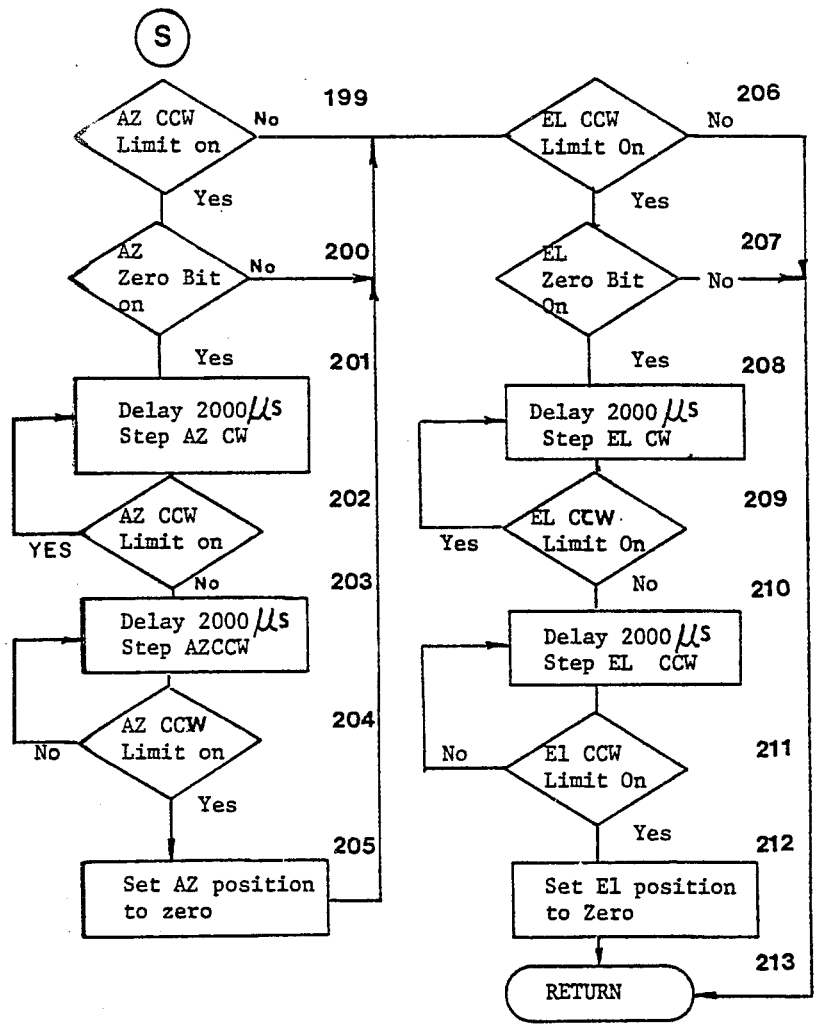

With respect to the numbers 199-213, FIG. 21, if both motors are stopped, a test is made to see if a home limit switch is on. If it is then the zero position bit is on. If it is also on then the motor is stepped back onto the limit switch and the absolute position is set to zero. After this, program transfers back to the place from which it was called.

Figure 22:
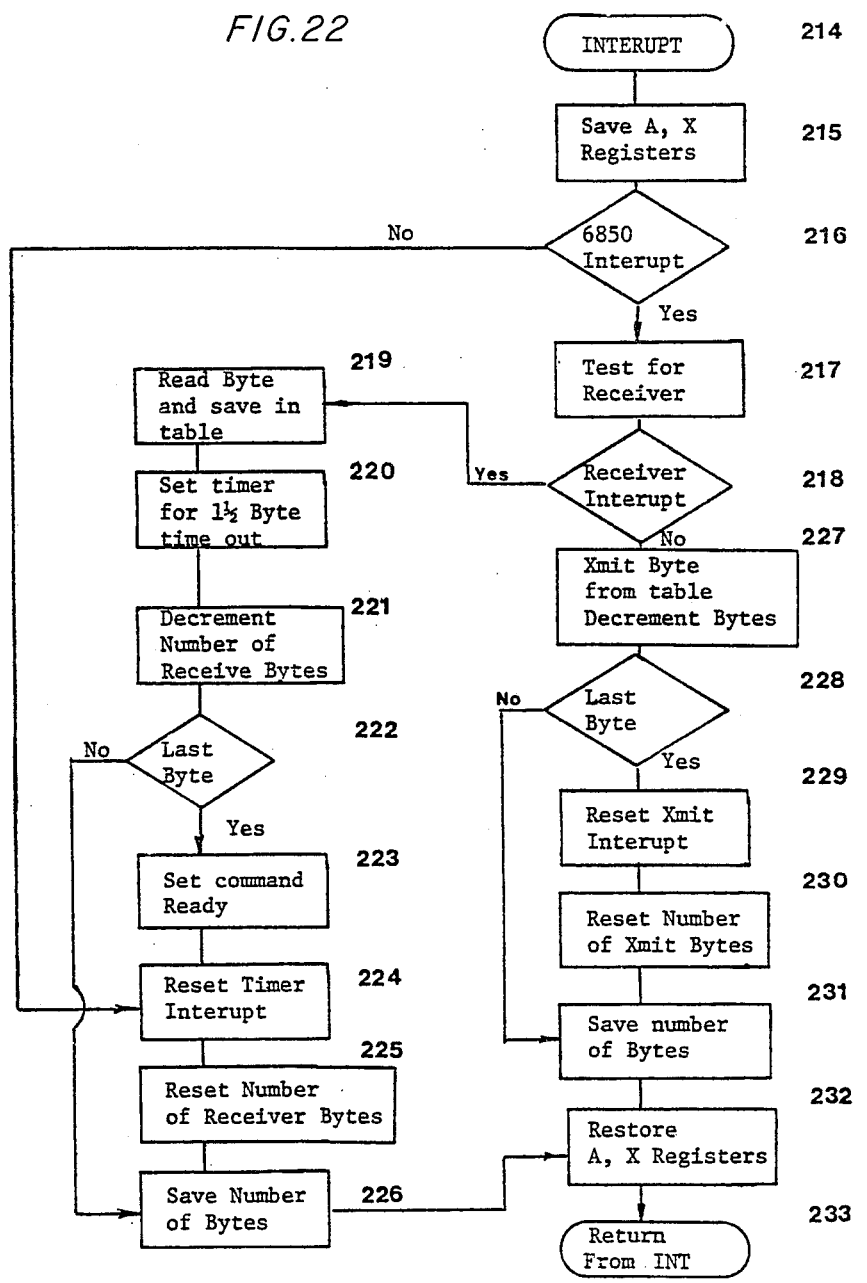

With respect to the numbers 214-216, FIG. 22, after an interrupt, the processor vectors program control to the interrupt service routine. The internal registers are saved and a test is made to see if the serial I/O device caused the interrupt. If not then the program assumes that it was the timer. The timer interrupt will reset the byte counter in the receiver. The timer interrupt will be caused if there is a transmission failure. After the interrupt was serviced then the internal registers will be restored and will return to where it was called from.

With respect to the numbers 217-226, if the serial I/O device interrupted, then a test is made to see if it was the transmitter or receiver section. If it was the receiver, data is read from the device and saved in the table. Then the timer is set for a byte and a half time out, the registers are restored, and the program returns. If it was the last byte to be received then the command ready bits are set and the timer is disabled.

With respect to the numbers 227-233, when the transmitter interrupts the data is read from a table and it is transformed to the data register. If it is the last byte, the transmitter is disabled from interrupt and the number of bytes to be sent is reset. Registers are restored and the program returns.

In operation, the collector is installed on its tower; and the respective heliostats are installed on their pedestals substantially as in the prior art. The difference is that the heliostats do not require the separate pedestal, or column, for the respective sensors for the respective heliostats. Preferably, the heliostats have full reflective surfaces although any of the types of heliostats employed in the prior art such as described in U.S. Pat. No. 4,276,872 entitled "Solar Systems Employing Ground Level Heliostats and Solar Collectors"; inventor Floyd A. Blake and Lynn L. Northrup, Jr., issued July 7, 1981, and assigned to Atlantic Richfield Company. As disclosed in that patent, and as well recognized, the heliostats have respective motors for movement in azimuth and elevation to obtain any desired angle. The respective motors will be connected with the controller 23 for each of the heliostats in an array about the collector target 21. When it is desired to move the heliostat, the operator then types in the respective commands into the controller 23. The heliostat controller specification is shown in the following data.

3.1 Data Format

The data format between the heliostat and the controlled shall be per the following table:

| WORD | FUNCTION |
|------|----------|
| 1 | Address |
| 2 | Azimuth (ms [most significant] byte) |
| 3 | Azimuth (ls [least significant] byte) |
| 4 | Elevation (ms byte) |
| 5 | Elevation (ls byte) |
| 6 | Mode |

3.1.1 Bit Configuration

The data word shall consist of one start bit, two stop bits, 8 data bits, and no parity bits.

3.1.1.1 Time Out

The HC shall receive 6 words per paragraph 3.1. The words shall be separated only by the normal two stop bits. If communication is lost during transmission, the HC shall time out after 1.5 bytes (word length) and continue its previous operation until a new instruction is received.

3.1.3 Azimuth and Elevation position

Position shall consist of two 8 bit words. A position command shall be an absolute quantity with the least significant bit being equal to 125 motor steps.

The heliostat processor shall subtract the commanded position from the accumulated position and command the stepper motor to move the differential steps.

3.1.4 The Mode byte

The Mode byte is defined by the format shown below.
If Bit 2=1
Bit 0: AZ [Azimuth]=1 cw [clockwise]
Bit 0: AZ=0 ccw [counter clockwise]
Bit 1: EL [Elevation]=1 cw
Bit 1: EL=0 ccw If Bit 2=0
Bit 032 1 AZ Stop
Bit 0=0 Continue previous operation
Bit 1=1 EL Stop
Bit 1=0 Continue previous operation Bit 2=Mode indication for bits 0 and 1

Bit 3=1 Slew AZ
Bit 3=0 Track AZ

Bit 4=1 Slew El to Stow
Bit 4=0 Track El

Bit 5=1 Request Status

Bit 6=1 Set position

Bit 7=1 Clear malfunction status

3.2 Wake Up

The wake up mode defines the logic used to power up the heliostat in the morning. The heliostat controller shall upon power up check limit switch status and if the stow limit switch is in the normal mode shall execute the commanded position. It shall check the limit switch status after 2 steps and continue if the limit switch is open. If the limit switch is closed it shall stop all motor operation and set a status bit.

3.3 Status Words

The heliostat status shall be sent upon request from the controller. The status shall consist of the following:

| WORD | FUNCTION |
|------|----------|
| 1 | Azimuth (ms byte) |
| 2 | Azimuth (ls byte) |
| 3 | Elevation (ms byte) |
| 4 | Elevation (ls byte) |
| 5 | Status |

3.3.1 Position

The heliostat controller shall keep track of its accumulated position. It shall send this position upon request from the master controller.

3.3.2 Status

The heliostat status word shall be defined by the following.

| Bit | Function |
|-----|----------|
| 0 | AZ cw limit sw [switch] |
| 1 | AZ ccw limit sw |
| 2 | El cw limit sw |
| 3 | el ccw limit sw |
| 4 | Motor movement AZ |
| 5 | Motor Movement El |
| 6 | Wake up malfunction |
| 7 | Power drop out |

Bits 0 and 1 shall indicate AZ limit switch activation if Bit 4=0 and shall indicate motor movement if Bit 4=1. Bits 2 and 3 shall indicate EL limit switch activation if Bit 5=0 and shall indicate motor movement if Bit 5=1.

3.3.2.1 Wake Up Malfunction

A wake up malfunction shall be defined as the inability of the heliostat to drive off of the limit switches.

3.3.2.2

Power drop out is defined as power up with the limit switches open.

3.4 Heliostat Error Conditions

3.4.1 Malfunction Conditions

Heliostat motors shall remain off after a malfunction condition (will not execute commands)

3.4.1.1

Bit seven of the mode shall reset the heliostat to normal operation (allow the controller to move the heliostat).

3.5 Motor Operation

3.5.1 Acceleration

If two motors are required to move to a position simultaneously they shall accelerate in parallel and both shall decelerate when either motor is required to stop. After both motors stop, the motor requiring additional position movement motor shall resume normal operation.

As a consequence of these actions, the respective motors on each of the heliostats operate in parallel simultaneously to attain the commanded position for the closest of the motors. Thereafter, the heliostat has its other motor operated to bring it into the other commanded position, either azimuth or elevation. The controller steps through the array of heliostats bringing them into their commanded position.

The controller then steps through the heliostats in the array in turn keeping the heliostats properly oriented at all times of the day to direct the solar energy onto the target collector.

At the end of the day, the controller 23 returns the heliostats to their stow position.

Of course, emergency controls such as are operative responsive to either manual means or to other signals such as high winds, or other foul weather forecasts, can be implemented to bring the heliostats to their stow position. The heliostats may be stowed in a conventional stow position either vertical, horizontal mirror up or horizontal mirror down as best for the particular locale depending upon the problems. Typical problems may be, for example, contaminants settling on the face of the mirrors if horizontal, wind loading if vertical, or the tendency of the mirrors to sag if stowed inverted horizontal. Of course, if the heliostat is brought to the normal stow position, the limit switches are tripped to facilitate inquiry by the controller 23. The program is readily versatile enough to inquire of more than one set of limit switches if such are desired to solve a plurality of problems.

From the foregoing it can be seen that this invention achieves the objects delineated hereinbefore. Specifically, it provides an economical, flexible method and system for controlling heliostats, and can be readily implemented to control a multiplicity of heliostats in a large array reflecting onto a central collector, or onto a plurality of collectors as is necessary for a particular installation.

In this embodiment, the respective means are represented by the parts of computers and accessories. They could be performed, nonetheless, by separate analog instruments if such an elaborate system were desired. It so happens that the use of microprocessors and the related technology enables performing the described operations uniquely advantageously and enables rapidly checking as indicated in the respective blocks of the program.

Although the invention has been described with a certain degree of particularity, it is understood that the present disclosure is made only by way of example and that numerous changes in the details of construction and the combination and arrangement of parts may be resorted to without departing from the spirit and scope of the invention, a reference for the latter being had to the appended claims.

What is claimed is:

1. In a heliostat control system including:
   a. a target collector for collecting solar energy and converting it into usable energy;
   b. at least one supported heliostat, each said heliostat being movable by respective motors in azimuth and elevation for reflecting the solar energy onto said collector;

the improvement comprising a central computer handling external data processing, communication and control, and a plurality of respective heliostats and a plurality of respective heliostat microprocessors, one at each heliostat, each being connected to said central computer and handling for its respective heliostat internal data processing, communication, and direct control of its respective azimuth and elevation stepper motor of elements f and g hereinafter; said central computer and each respective microprocessor at each respective heliostat including respective routines that effect communicating and coaction such that there are provided the following system elements;
   c. monitor means for monitoring a current position of a respective said heliostat;
   d. computer means for computing a commanded position for a respective said heliostat to be at a particular time of day;
   e. cumulating means for determining commanded number of steps for respective stepper motors in each of azimuth and elevation to reach the commanded position;
   f. respective azimuth stepper motors connectable with a source of power;
   g. respective elevation stepper motors connectable with a source of power;
   h. energizer means for energizing respective said stepper motors; said energizer means being connected with said cumulating means and said stepper motors and adapted to operate selectively both and thereafter either of said stepper motors for a given heliostat; and
   i. comparison means for comparing accumulated steps to commanded steps; said comparison means being connected with elements c, d, e, and h and being adapted to stop both said motors a predetermined number of steps away from said commanded number of steps to allow deceleration from slewing speeds such that the closest motor reaches its commanded position, and thereafter energizing the remaining motor to attain its commanded position and stop at a predetermined number of steps away from its said commanded position.

2. In a method of controlling at least one heliostat to reflect solar energy onto a collector including moving said heliostat in azimuth and elevation by respective motors, the improvement comprising employing a central computer and a plurality of heliostats and a plurality of respective heliostat microprocessors, one at each heliostat, communicating sequentially and respectively with respective routines such that there is carried out for each heliostat the following steps:
   a. calculating a command position for said heliostat to be at a particular time of day;
   b. initializing and powering up at a predetermined position and monitoring the position thereafter;
   c. accumulating the number of steps in azimuth and elevation to each motor to get to said commanded position from said predetermined position each time said heliostat is to be moved;
   d. energizing both said azimuth and elevation stepper motors to run parallel until a predetermined number of steps away from a commanded position of the closest of said azimuth and elevation motors, thereafter de-energizing said motors to allow deceleration from slewing speeds, operating both said motors in parallel until the closest of said azimuth and elevation motors is at said commanded position; and thereafter energizing the remaining motor to bring it to its said commanded position.

* * * * *